United States Patent
Hoekstra et al.

(10) Patent No.: US 10,113,039 B2
(45) Date of Patent: Oct. 30, 2018

(54) PROCESS FOR PRODUCING SHAPED ARTICLES OF A POLYMER COMPOSITION CONTAINING A POLYAMIDE, HALOGEN-FREE FLAME RETARDANT AND GLASS FIBERS

(71) Applicant: DSM IP ASSETS B.V., Heerlen (NL)

(72) Inventors: Johannes Hoekstra, Echt (NL); Rui Zhang, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 27 days.

(21) Appl. No.: 15/305,140

(22) PCT Filed: Apr. 20, 2015

(86) PCT No.: PCT/EP2015/058480
§ 371 (c)(1),
(2) Date: Oct. 19, 2016

(87) PCT Pub. No.: WO2015/162078
PCT Pub. Date: Oct. 29, 2015

(65) Prior Publication Data
US 2017/0044336 A1 Feb. 16, 2017

(30) Foreign Application Priority Data

Apr. 24, 2014 (EP) .................... 14165884

(51) Int. Cl.
| | | |
|---|---|---|
| *C08L 77/00* | (2006.01) | |
| *C08J 5/10* | (2006.01) | |
| *C08J 3/22* | (2006.01) | |
| *C08J 5/04* | (2006.01) | |
| *C08K 7/14* | (2006.01) | |
| *C08K 5/20* | (2006.01) | |
| *C08K 5/3492* | (2006.01) | |

(52) U.S. Cl.
CPC ................. *C08J 5/10* (2013.01); *C08J 3/226* (2013.01); *C08J 5/043* (2013.01); *C08K 5/20* (2013.01); *C08K 5/34924* (2013.01); *C08K 7/14* (2013.01); *C08J 2377/02* (2013.01); *C08J 2377/04* (2013.01); *C08J 2377/06* (2013.01)

(58) Field of Classification Search
None
See application file for complete search history.

(56) References Cited

U.S. PATENT DOCUMENTS

| | | |
|---|---|---|
| 4,789,698 A | 12/1988 | Bonten et al. |
| 5,866,648 A | 2/1999 | Saito et al. |
| 7,803,856 B2 * | 9/2010 | Perego ................. C08K 5/5313 524/100 |
| 7,968,629 B2 | 6/2011 | Tsunoda et al. |
| 2002/0086927 A1 * | 7/2002 | De Schryver ........... C08K 3/30 524/404 |
| 2005/0143503 A1 | 6/2005 | Bauer et al. |
| 2012/0157589 A1 | 6/2012 | Roth et al. |

FOREIGN PATENT DOCUMENTS

| | | |
|---|---|---|
| BE | 1 010 393 | 7/1998 |
| CN | 103 408 929 | 11/2013 |

OTHER PUBLICATIONS

CN 103408929 A—machine translation.*
International Search Report for PCT/EP2015/058480 dated Jul. 9, 2015, 4 pages.
Written Opinion of the ISA for PCT/EP2015/058480 dated Jul. 9, 2015, 5 pages.

* cited by examiner

*Primary Examiner* — Ana L. Woodward
(74) *Attorney, Agent, or Firm* — Nixon & Vanderhye P.C.

(57) ABSTRACT

The invention relates to a process for producing shaped articles comprising the steps of: —compounding a polymer composition (A) containing a polyamide, a halogen-free melamine based flame retardant and at most 15 wt. % of glass fibers into pellets, compounding a polymer composition (B) containing a polyamide, more than 15 wt. % of glass fibers, and not containing halogen-free melamine based flame retardant into pellets, —producing a mixture comprising the pellets of polymer composition (A) and (B), —molding the mixture comprising the pellets of polymer composition (A) and (B) into shaped articles.

10 Claims, No Drawings

PROCESS FOR PRODUCING SHAPED ARTICLES OF A POLYMER COMPOSITION CONTAINING A POLYAMIDE, HALOGEN-FREE FLAME RETARDANT AND GLASS FIBERS

This application is the U.S. national phase of International Application No. PCT/EP2015/058480 filed 20 Apr. 2015 which designated the U.S. and claims priority to EP 14165884.9 filed 24 Apr. 2014, the entire contents of each of which are hereby incorporated by reference.

The invention relates to a process for producing shaped articles of a polymer composition containing a polyamide, halogen-free melamine based flame retardant and glass fibers and to a mixture of pellets for the production of the shaped articles.

Polymer compositions containing a polyamide, glass fibers and one or more flame retardants are often used for the production of shaped articles used in electrical equipment, for example domestic appliances, molded case circuit breakers, connectors, etc.

An important test for determining the flame retardancy of the polymer compositions is the glow wire test, that determines the Glow Wire Ignition Temperature (GWIT). This test simulates the effect of heat as it may arise in malfunctioning electrical equipment, such as with overloaded or glowing components.

The test provides a way of comparing the temperatures at which polymer compositions ignite under these circumstances.

Melamine cyanurate, which is a halogen-free melamine based flame retardant, is a flame retardant that provides good results in obtaining a high value for the GWIT in polymer compositions containing a polyamide.

Furthermore it is important for the mechanical properties of such polymer compositions to use a high concentration of glass fibers. A problem that arises at a high concentration of glass fibers however is that it is not possible to produce the polymer composition at a commercial scale. Normally such composition are prepared by compounding the components in a kneader, such as a co-rotating twin screw extruder, into pellets of a homogeneous mixture of the composition. Such pellets are used in molding equipment, such as injection molding machines, to produce the shaped articles. Because of the high temperatures that occur in the kneader while processing the highly glass fiber filled composition decomposition of the halogen-free melamine based flame retardant, and particularly melamine cyanurate takes place. This causes the formation of a high amount of small gas bubbles in the polymer composition, rendering the composition unfit for granulation and subsequent processing.

Object of the invention is to provide a solution for this problem. Surprisingly this object has been solved by a process comprising the steps of:
- production of pellets of a polymer composition (A) containing a polyamide, a halogen-free melamine based flame retardant and at most 15 wt. % of glass fibers and production of pellets of a polymer composition (B) containing a polyamide, more than 15 wt. % of glass fibers, and not containing halogen-free melamine based flame retardant,
- producing a mixture containing the pellets of polymer composition (A) and (B),
- molding the mixture containing the pellets of polymer composition (A) and (B) into shaped articles.

Surprisingly no gas bubbles have been obtained during the compounding of the pellets and the mixture containing the pellets is produced without problems into shaped articles of a polymer composition containing a polyamide, halogen-free melamine based flame retardant and glass fibers. The shaped articles show a favorable value for the GWIT.

The mixture comprising the pellets of polymer compositions (A) and (B) may contain 50-90 wt. % of pellets of polymer composition (A) en 50-10 wt. % of pellets of polymer composition (B). Preferably the mixture contains 60-80 wt. % of pellets of polymer composition (A) en 40-20 wt. % of pellets of polymer composition (B), more preferably the mixture contains 65-75 wt. % of pellets of polymer composition (A) en 35-25 wt. % of pellets of polymer composition (B).

Preferably the glass fiber content in the pellets of polymer composition (A) is less than 13 wt. %, more preferably less than 10 wt. %.

The polyamide used in the polymer composition (A) and (B) suitably is a polyamide having a melting point below 260° C. (measured by DSC, according to ISO 11357-1:1997 under nitrogen atmosphere (purge 50 ml/min) using a heating and cooling rate of 20 K/min). Preferably PA-6 or PA-66 are used, most preferably PA-6 is used.

As glass fibers E-glass fibres and S-glass fibers may be used. Preferably E-glass fibers are used. The glass fibers are suitably used in the compounding of the polymer compositions as chopped glass fibers. The length of the chopped glass fibres may vary between 2 and 20 mm. Preferably the length is 4.5 mm. The mixture of pellets of polymer composition (A) and (B), it is the final polymer composition of the shaped article, contains preferably at least 17, more preferably at least 20, most preferably at least 25 wt. % of glass fibers. The mixture contains preferably at most 35 wt. % of glass fibers.

The polymer composition (A) may contain 5 wt. %-45 wt. % halogen-free melamine based flame retardant. The mixture containing the pellets of polymer composition (A) and (B) contains preferably at least 5 wt. % more preferably at least 10 wt. %, most preferably at least 12.5 wt. % of halogen-free melamine based flame retardant. The mixture contains preferably at most 30 wt. % of halogen-free melamine based flame retardant.

Preferably, the halogen-free melamine based flame retardant in polymer composition (A) is phosphorous-free, as the process according to the invention is results in shaped articles with particularly sufficient flame retardancy.

Suitable halogen-free melamine based flame retardants are for example melamine, melamine derivatives, melamine condensation products and mixtures thereof. In the context of this application a melamine derivative is understood to be melamine with one or more amine groups having been substituted with one or more alkyl, aryl, aralkyl or cycloalkyl groups, for example to be chosen from the group comprising methyl, ethyl, ethenyl, phenyl or toluyl. Examples of such melamine derivatives are N,N',N"-triphenylmelamine. Another example of a melamine derivative is melamine cyanurate. In the context of this application a melamine condensation product is understood to be a compound in which two or more melamine compounds are connected to one another, for example melam, melem, melon and higher oligomers and menthone, which condensation products can for example be obtained using the process described in WO 96/16948.

Preferably, the halogen-free melamine based flame retardant is chosen from the group of melamine, melamine cyanurate, melam, melem and melon and mixtures thereof. The advantage is that processing of the polyamide compounds is easier and that deposition of volatile components in the mould is reduced. More preferably, the halogen-free melamine based flame retardant is melamine cyanurate (mecy), as this is readily available.

Preferably, the polymer composition (A) may contain 5 wt. %-45 wt. % melamine cyanurate. The mixture containing the pellets of polymer composition (A) and (B) contains more preferably at least 5 wt. % even more preferably at least 10 wt. %, most preferably at least 12.5 wt. % of melamine cyanurate. The mixture contains even more preferably at most 30 wt. % of melamine cyanurate.

The polymer compositions (A) and/or (B) may contain one or more further flame retardants. Examples of further flame retardants include metal phosphinates, as well as other phosphor containing flame retardants.

Metal phosphinates include metal salts of phosphinic acids and/or diphosphinic acids or polymeric derivatives thereof.

Suitably, the metal phosphinate is a metal of a phosphinic acid of the formula $[R^1R^2P(O)O]^-{}_mM^{m+}$ (formula I) and/or a diphosphinic acid of the formula $[O(O)PR^1—R^3—PR^2(O)O]^{2-}{}_nM_x^{m+}$ (formula II), and/or a polymer thereof, wherein $R^1$ and $R^2$ are equal or different substituents chosen from the group consisting of hydrogen, linear, branched and cyclic C1-C6 aliphatic groups, and aromatic groups, $R^3$ is chosen from the group consisting of linear, branched and cyclic C1-C10 aliphatic groups and C6-C10 aromatic and aliphatic-aromatic groups, M is a metal chosen from the group consisting of Mg, Ca, Al, Sb, Sn, Ge, Ti, Zn, Fe, Zr, Ce, Bi, Sr, Mn, Li, Na, and K, and m, n and x are equal or different integers in the range of 1-4.

Suitable metal phosphinates are described for example in DE-A 2 252 258, DE-A 2 447 727, PCT/W-097/39053 and EP-0932643-B1. Preferred phosphinates are aluminium-, calcium- and zinc-phosphinates, i.e. metal phosphinates wherein the metal M=Al, Ca, Zn respectively, and combinations thereof. Also preferred are metal phosphinates wherein $R^1$ and $R^2$ are the same or different and are equal to H, linear or branched $C_1$-$C_6$-alkyl groups, and/or phenyl. Particular preferably, $R^1$, $R^2$ are the same or different and are chosen from the group consisting of hydrogen (H), methyl, ethyl, n-propyl, iso-propyl, n-butyl, tert.-butyl, n-pentyl and phenyl. More preferably, $R^1$ and $R^2$ are the same or different and are chosen from the group of substituents consisting of H, methyl and ethyl.

Also preferably $R^3$ is chosen from the group consisting of methylene, ethylene, n-propylene, iso-propylene, n-butylene, tert.-butylene, n-pentylene, n-octylene, n-dodecylene, phenylene and naphthylene.

Highly preferably, the metal phosphinate comprises a hypophosphate and/or a $C_1$-$C_2$ dialkylphosphinate, more preferably Ca-hypophosphate and/or an Al—$C_1$-$C_2$ dialkylphosphinate, i.e. Al-dimethylphosphinate, Al-methylethylphosphinate and/or Al-diethylphosphinate. The best results are obtained if Al-diethylphosphinate is used.

The phosphor containing flame retardant can be any phosphor containing compound that itself is a flame retardant and/or is a flame retardant synergist for phosphinate flame retardants. Suitable phosphor containing compounds that can be used are described, for example in PCT/EP97/01664, DE-A-197 34437, DE-A-197 37 72, and DE-A-196 14 424.

In one embodiment, the process according to the invention for producing shaped articles comprises the steps of:

compounding a polymer composition (A) containing a polyamide, a halogen-free melamine based flame retardant, not being melamine cyanurate, and at most 15 wt. % of glass fibers into pellets, compounding a polymer composition (B) containing a polyamide, more than 15 wt. % of glass fibers not containing halogen-free melamine based flame retardant and not being melamine cyanurate, into pellets, producing a mixture comprising the pellets of polymer composition (A) and (B), molding the mixture comprising the pellets of polymer composition (A) and (B) into shaped articles.

In another embodiment the process according to the invention for producing shaped articles comprises the steps of:

compounding a polymer composition (A) containing a polyamide, melamine cyanurate and at most 15 wt. % of glass fibers into pellets, compounding a polymer composition (B) containing a polyamide, more than 15 wt. % of glass fibers not containing me into pellets, producing a mixture comprising the pellets of polymer composition (A) and (B), molding the mixture comprising the pellets of polymer composition (A) and (B) into shaped articles.

Optionally the compositions contains one or more anti-drip additives, for instance PTFE.

The further flame retardants are preferably added to the polymer composition (B).

The mixture of polymer composition (A) and (B) may comprise 5-40 wt. % of further flame retardants.

The polymer compositions (A) and (B) may further contain usual additives, like for example processing aides, pigments, colorants, stabilizers, fillers etc. The mixture containing the pellets of polymer compositions (A) and (B) contains preferably less than 10 parts by weight of further organic additives, more preferably less than 5 parts by weight, most preferably less than 2 parts by weight.

The compounding of polymer compositions (A) and (B) may be carried out by feeding a dry blend of the components of each compositions, or the components of each composition separately, with dosing equipment to the feed opening of a kneader, preferably a co-rotating twin screw extruder. The glass fibers however are normally fed via a vent opening further downstream in the kneader, at a place where the polyamide is already in the molten state. This is to avoid excessive breakage of the glass fibers. The process according to the invention is especially advantageous, if the output of the kneader while producing the polymer compositions (A) and/or (B) is at least 100 kg/hour, more preferably at least 200 kg/hour, even more preferably at least 500 kg/hour. With larger extruders and higher rotational speeds of the extruder screws higher outputs may be obtained. The polymer compositions are normally pelletized at the outlet of the extruder, preferably by forming strands leaving the die head of the extruder and cutting the strands into pellets. Thereafter the pellets may be mixed by using normal dry blending equipment, for example a tumble dryer.

In order to reduce segregation of the pellets of polymer composition (A) and (B) the ratio of the length as well as the ratio of the width or diameter of the pellets of polymer composition (A) and of the pellets of polymer composition (B) preferably is between 0.5 and 1.5, more preferably between 0.8 and 1.2.

In this way it is possible to transport the mixture over long distances, without the occurrence of segregation.

The pellet mixture may be molded into shaped objects by an injection molding machine. Examples of shaped objects include connectors, housings, molded case circuit breakers.

The invention also relates to the mixture comprising the pellets of polymer composition (A) and (B) as defined above.

EXAMPLES

Ingredients:
PA6: Akulon™ K122 from DSM
Glass fiber: 173X-11p from 3B fiberglass
Flame retardant: melamine cyanurate MC50 from BASF
Flame retardant: Exolit™ OP1311 from Clariant
Mold release agent: ethylene-bis-stearamide (Acrawax C) from Lonza
Experimental.
All compositions were compounded on a 40 mm co-rotating twin screw extruder (Berstorff™ ZE40/48UTS). The polymer, flame retardants and mold release agent were added to the feed opening of the extruder, the glass fibers were dosed downstream to the extruder, where the polymer was in the molten state. The pellets were mixed in a tumble dryer. The final pellet mixtures were molded into various test samples for property testing using an Engel 75A injection moulding machine:
80×80×1.5 mm plaques for GWIT testing.
1.5 mm UL94V specimen for the vertical burning test
ISO 527-1A specimen for tensile testing.
GWIT tests were conducted in accordance with IEC60695-2-13, tensile tests were done in accordance with ISO527 and vertical burning tests were conducted in accordance to UL 94V.
Table 1 gives an overview of the experiments performed.

TABLE 1 experiments performed

|  | CE-A | CE-B | (A) | (B) | E1 |
|---|---|---|---|---|---|
| PA6 | 56.8 | 44.3 | 46.4 | 39.34 |  |
| glass-fiber | 25 | 25 | 10 | 60 |  |
| MRA | 0.2 | 0.2 |  | 0.66 |  |
| MeCy |  | 12.5 | 17.9 |  |  |
| OP1311 | 18 | 18 | 25.7 |  |  |
| (A) |  |  |  |  | 70 |
| (B) |  |  |  |  | 30 |
| strand integrity | OK | foamed | OK | OK |  |
| tensile modulus [Mpa] | 9000 | x |  |  | 11000 |
| tensile strenght [Mpa] | 130 | x |  |  | 115 |
| eab [%] | 2 | x |  |  | 2 |
| GWIT @ 1.5 mm [° C.] | 775 | x |  |  | 825 |
| UL 94V @ 1.5 mm | V0 | x |  |  | V0 |

Comparative Experiment A and B

In comparative experiment A (CE-A) the polymer composition does not contain any melamine cyanurate, but different flame retardants. It shows that the flame retardant is thermally sufficiently stable to survive the processing of glass filled PA6 on a twin screw extruder. The material can be pelletized and is usable for injection-molding to transform it into shaped articles. However the GWIT levels are below 800° C. and therefor do not fulfill the requirements.

Comparative experiment B (CE-B) proves that when Melamine cyanurate is added to the formulation of CE-A the material can no longer be pelletized due to massive degradation of the melamine cyanurate resulting in foaming of the extruded strand. Such material cannot be used for injection-molding.

Example I

A composition (A) containing a high amount of the flame retardants, among which the melamine cyanurate and a small amount of glass fibers is produced that can be stranded into good quality pellets. Further a highly glass fiber filled composition (B) is produced, which does not contain flame retardant. Also this composition was easily be stranded into good quality pellets. See further table 1 (A) and (B).

The two compositions (A) and (B) were mixed in a 30:70 ratio to obtain the final granulate mixture that was injection molded into the test samples articles. Compared to CE-A this sample has better GWIT ratings and compared to CE-B this route allows for the production of shaped articles by injection molding.

The invention claimed is:

1. A process for producing shaped articles comprising the steps of:
    (a) forming polymer pellets (A) of a polymer composition (A) by compounding in a first kneader a polyamide, a halogen-free melamine based flame retardant and at most 15 wt. % of glass fibers,
    (b) forming polymer pellets (B) of a polymer composition (B) by compounding in a second kneader a polyamide and more than 15 wt. % of glass fibers in the absence of a halogen-free melamine based flame retardant,
    (c) producing a mixture of pellets comprising the polymer pellets (A) of polymer composition (A) and the polymer pellets (B) of polymer composition (B), and
    (d) injection molding into articles the mixture of pellets comprising the polymer pellets (A) of polymer composition (A) and the polymer pellets (B) of polymer composition (B).

2. The process according to claim 1, wherein the mixture comprises, based on total weight of the mixture of the polymer pellets (A) and the polymer pellets (B), 50-90 wt. % of the polymer pellets (A) of the polymer composition (A) and 50-10 wt. % of polymer pellets (B) of the polymer composition (B).

3. The process according to claim 1, wherein the polyamide in the polymer compositions (A) and (B) has a melting point below 260° C. as measured by DSC, according to ISO 11357-1:1997 under nitrogen atmosphere (purge 50 ml/min) using a heating and cooling rate of 20 K/min.

4. The process according to claim 1, wherein the polyamide comprises polyamide-6 (PA-6) or polyamide-66 (PA-66).

5. The process according to claim 1, wherein the polymer composition (A) contains 15-30 wt. % halogen-free melamine based flame retardant.

6. The process according to claim 1, wherein the halogen-free melamine based flame retardant of polymer composition (A) is phosphorous-free.

7. The process according to claim 1, wherein the halogen-free melamine based flame retardant is selected from the group consisting of melamine, melamine cyanurate, melam, melem and mixtures thereof.

8. The process according to claim 1, wherein the output of at least one of the first and second kneaders when producing the polymer pellets (A) and (B) of the polymer compositions (A) and (B), respectively, is more than 100 kg/hour.

9. The process according to claim 1, wherein the pellets (A) of composition (A) and the pellets (B) of composition (B) have a length dimension and either a width dimension or a diameter dimension, and wherein a ratio of the length of the pellets (A) of composition (A) to the length of the pellets (B) of composition (B) as well as a ratio of either the width of the pellets (A) of composition (A) to the width of the pellets (B) of composition (B) or a ratio of the diameter of the pellets (A) of polymer composition (A) to the diameter of the pellets (B) of polymer composition (B) is each between 0.5 and 1.5.

10. The process according to claim 1, wherein the pellets (A) of composition (A) and the pellets (B) of composition (B) have a length dimension and either a width dimension or a diameter dimension, and wherein a ratio of the length of the pellets (A) of composition (A) to the length of the pellets (B) of composition (B) as well as a ratio of either the width of the pellets (A) of composition (A) to the width of the pellets (B) of composition (B) or a ratio of the diameter of the pellets (A) of polymer composition (A) to the diameter of the pellets (B) of polymer composition (B) is each between 0.8 and 1.2.

\* \* \* \* \*